(12) United States Patent
Kim et al.

(10) Patent No.: US 7,950,694 B2
(45) Date of Patent: May 31, 2011

(54) TETHER FOR AIRBAG MODULE

(75) Inventors: Jin Kook Kim, Kangwon-do (KR); Sung Geun Jang, Kangwon-Do (KR)

(73) Assignee: Autoliv Development AB, Vargarda (SE)

( * ) Notice: Subject to any disclaimer, the term of this patent is extended or adjusted under 35 U.S.C. 154(b) by 68 days.

(21) Appl. No.: 12/436,967

(22) Filed: May 7, 2009

(65) Prior Publication Data

US 2009/0295137 A1    Dec. 3, 2009

(30) Foreign Application Priority Data

May 9, 2008   (KR) .................. 10-2008-0043419

(51) Int. Cl.
*B60R 21/16* (2006.01)
(52) U.S. Cl. ................................................ 280/743.2
(58) Field of Classification Search ............... 280/743.2
See application file for complete search history.

(56) References Cited

U.S. PATENT DOCUMENTS

| | | | | |
|---|---|---|---|---|
| 5,570,905 | A * | 11/1996 | Dyer ....................... | 280/743.2 |
| 7,055,858 | B2 * | 6/2006 | Takimoto et al. .......... | 280/743.1 |
| 7,266,856 | B2 * | 9/2007 | Kohlruss et al. ........... | 15/97.3 |
| 7,404,572 | B2 * | 7/2008 | Salmo et al. .............. | 280/729 |
| 7,621,561 | B2 * | 11/2009 | Thomas et al. ........... | 280/743.2 |
| 7,753,405 | B2 * | 7/2010 | Ishiguro et al. ........... | 280/739 |
| 2010/0258334 | A1 * | 10/2010 | Akaike et al. ............. | 174/126.1 |

* cited by examiner

*Primary Examiner* — Paul N Dickson
*Assistant Examiner* — Nicole Verley
(74) *Attorney, Agent, or Firm* — Brinks Hofer Gilson & Lione

(57) ABSTRACT

A tether for a passenger airbag cushion of a vehicle includes first and second twist preventing parts formed at both edges of the tether in the deployment direction of the tether by an inflator such that the thickness of both edges of the tether is increased. The airbag cushion is more reliably deployed because the tether is not twisted or folded due to the above structure when the tether is deployed.

6 Claims, 7 Drawing Sheets

TETHER FOR AIRBAG MODULE

TECHNICAL FIELD OF INVENTION

The present invention relates to a tether for an airbag cushion of a vehicle. More particularly, the present invention relates to a tether for an airbag cushion of a vehicle, in which the thickness of the tether, which connects a airbag cushion front part making contact with the body of a passenger with an airbag cushion rear part, into which gas is injected from an inflator, is increased at both side parts of the tether such that the tether can be prevented from being twisting.

BACKGROUND OF INVENTION

Generally, a vehicle is provided therein with seat belts, which restrain passengers as well as a driver for the sake of safety in crash, in order to attenuate deceleration exerted on a body of the passenger. The seat belt retrains the passenger in the event of a collision.

In addition to the seat belt, the vehicle is provided with an airbag module rapidly inflating an airbag between a driver and a steering wheel or between a passenger in a passenger seat and an instrument panel in crash to attenuate the injury of the driver or the passenger caused by impact occurring in the crash.

Figure 1:
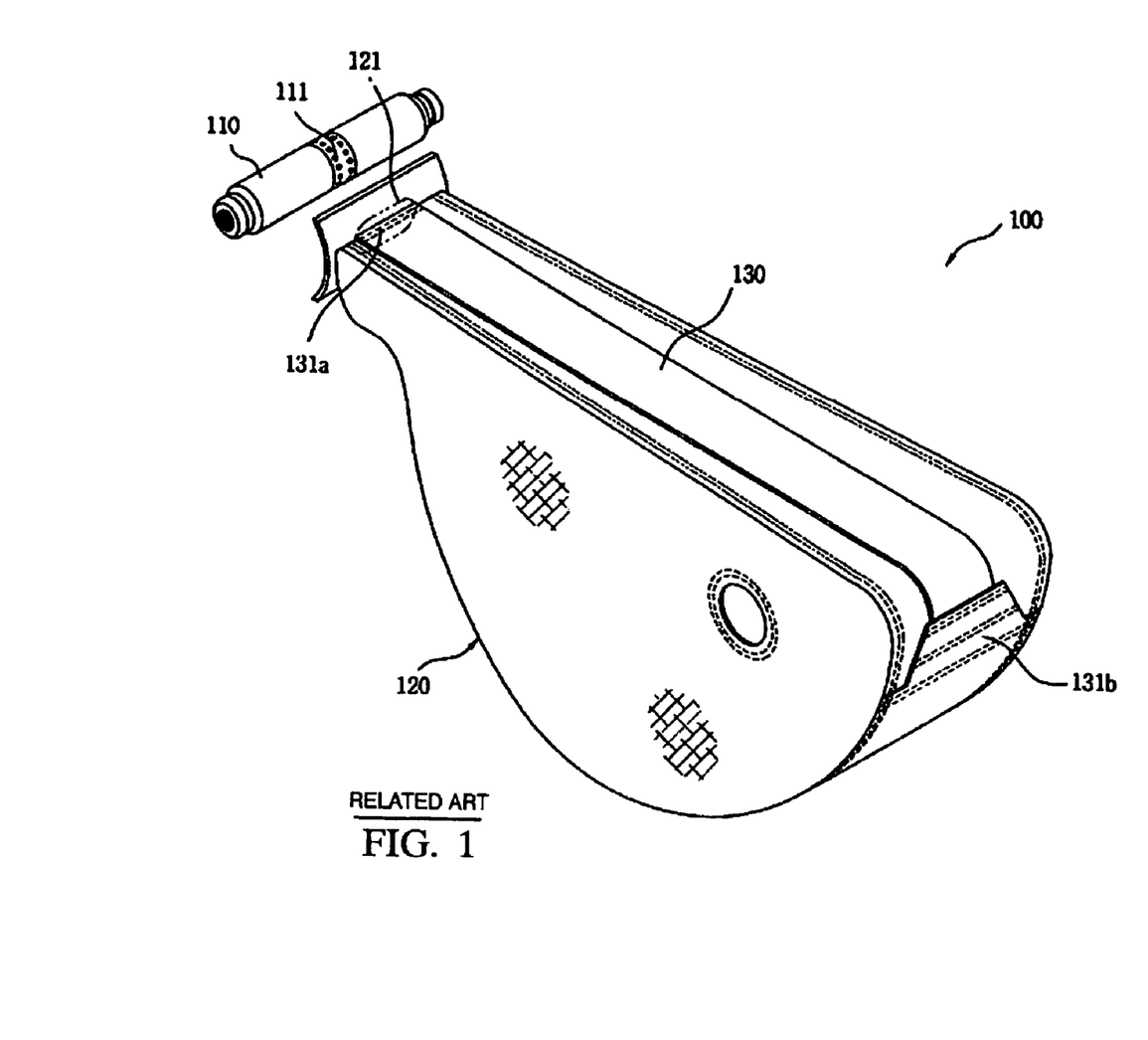
FIG. 1 is a perspective view schematically showing a passenger airbag module for a vehicle according to the related art.

FIG. 1 is a perspective view schematically showing an airbag module according to the related art. As shown in FIG. 1, a passenger airbag module 100 for a vehicle includes an inflator 110, an airbag cushion 120, and a tether 130. The inflator 110 generates nitrogen gas (N2) upon explosion of a detonator. The airbag cushion 120 expands and deploys through a deployment part by nitrogen gas generated from the inflator 110. The tether 130 connects a front part of the airbag cushion 120, which makes contact with the body of the passenger, with a rear part of the airbag cushion 120, into which the N2 is injected from the inflator 110.

The airbag module further includes an impact sensor (not shown) and an electronic control module (not shown). The impact sensor is installed in the instrument panel to generate an impact signal when a driving speed of the vehicle is abruptly decreased or the acceleration of gravity reaches a setting value. The electronic control module explodes the detonator of the inflator 110 according to the impact signal.

The inflator 110 of the airbag module 100 includes a gas generating agent generating the N2 as the detonator of the inflator 110 is ignited, and the tether 130 is deployed by the nitrogen gas in a state in which the tether 130 is wound around the inflator 110.

In order to constantly maintain the deployment length of the airbag cushion 120, the tether 130 includes a first support part 131a fixing one end of the tether 130 to the rear part of the airbag cushion 120 and a second support part 131b fixing the other end of the tether 130 to the front part of the airbag cushion 120.

Regarding the operation of the airbag module 100 having the above structure, when the driving speed of the vehicle is abruptly decreased due to head-on crash, the impact sensor detects the impact occurring in the head-on crash and generates the impact signal.

At this time, the electronic control module recognizes the impact signal, so the electronic control module ignites the detonator of the inflator 110 to burn the gas generating agent of the inflator 110, so that the gas generating agent rapidly generates the nitrogen gas. While moving from gas exhaust ports 111 formed in the inflator 110 to a gas injection port 121 of the airbag cushion 120, the nitrogen gas expands and deploys the airbag cushion 120 toward the passenger.

The deployed airbag cushion 120 makes contact with the passenger to partially absorb impact. In addition, when the deployed airbag cushion 120 collides with the head or the breast of the passenger by inertia, the N2 of the airbag cushion 120 is rapidly exhausted through gas exhaust holes of the airbag cushion 120 to attenuate the impact exerted on the front part of the passenger.

Accordingly, impact power applied to the passenger in the crash of the vehicle is effectively attenuated, so that the second collision, that is, the collision between other components of the vehicle and the body of the passenger can be reduced.

However, when the tether 130 wound around the inflator is deployed by the N2, the tether 130 cannot be linearly deployed toward the passenger, but can be spirally deployed due to the increase of the friction between the inflator and the tether. In addition, when the tether 130 is spirally deployed, the tether 130 may be twisted so that the deployment length of the airbag cushion is reduced, and the impact absorbing effect is reduced at the front of the passenger due to the reduction in deployment length of the airbag cushion. Accordingly, the airbag cushion may be abnormally deployed.

SUMMARY OF THE INVENTION

Accordingly, the present invention has been made keeping in mind the above problems occurring in the prior art, and an object of the present invention is to provide a tether for an airbag cushion of a vehicle, capable of preventing the tether from being twisted due to the friction between the tether and an inflator when the tether is deployed by increasing the thickness of the tether at both side parts of the tether.

It is another object of the present invention to provide a tether for an airbag cushion of a vehicle, capable of preventing the tether from being twisted when the tether is released from the inflator by folding both edges of a tether surface making contact with the inflator and sewing both edges of the tether surface.

It is still another object of the present invention to provide a tether for an airbag cushion of a vehicle, capable of increasing adhesion of folded edges formed at both side parts of the tether by cutting the folded edges at a regular interval.

According to the present invention, a tether, which is wound around an inflator installed in an instrument panel provided adjacent a passenger seat of a vehicle to restrain an airbag cushion deployed and expanded by gas generated from the inflator and connected with both sides of an inner surface of an airbag cushion, includes first and second twist preventing parts provided at both side edges of the tether along a deployment direction of the tether by the inflator, such that a thickness of the tether is increased at both edges.

As described above, according to the present invention having the above structure, both edges of the tether determining the deployment shape of the airbag cushion are folded by a predetermined width and sewed, so that the tether can be prevented from being twisted and folded upon the deployment and inflation of the airbag cushion. In addition, the deployment length of the tether is not reduced because there is no twisting or folding, so that the airbag cushion can be exactly deployed and expanded. When the airbag cushion is exactly deployed and inflated toward the passenger, the impact exerted on the passenger may be attenuated.

Thus, described herein is an airbag module adjacent a vehicle seat. The airbag module includes an inflator for generating a gas, an airbag cushion adapted to be inflated by the gas, and a tether having a first end coupled to the airbag cushion at a first point, a second end coupled to the airbag cushion at a second point spaced apart from the first point, and an edge extending therebetween, said tether formed of a fabric having a fabric thickness and having a twist preventing part disposed along the edge, said twist preventing part having a thickness greater than the fabric thickness.

Also described herein, an airbag module tether has a centerline and a first edge and a second edge spaced apart about the centerline, the centerline of the tether being characterized by the fabric thickness, and the tether includes a first twist preventing part adjacent a first edge having a first edge thickness greater than the fabric thickness, and a second twist preventing part adjacent a second edge having a second edge thickness greater than the fabric thickness. Also described herein, the first edge thickness is equal to the second edge thickness. Further described herein, the first twist preventing part and the second twist preventing part include fabric folded along the first edge and the second edge, respectively, thereby forming a first edge fold and the second edge fold, respectively.

The first twist preventing part and the second twist preventing part may also have stitches to fasten the first edge fold and the second edge fold, and the stitches in the first edge fold may be disposed in at least two sewed lines parallel to the first edge such that the stitches in one sewed line are offset relative to the stitches in the other sewed line. The first twist preventing part and the second twist preventing part may also have an adhesive bonding the first edge fold and the second edge fold. The first edge fold and the second edge fold may include a plurality of cutouts separated by connection sections along the first edge and the second edge. Also, the first twist preventing part and the second twist preventing part may be a coating applied to the fabric.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which:

FIG. 1 is

DETAILED DESCRIPTION OF INVENTION

According to the present invention, both edge parts of a tether may be folded by a predetermined width and form an edge fold to increase the thickness of both side parts, thereby deploying the tether toward a passenger in a straight direction without being twisted. The tether may be sewed along the edge in the deployment direction thereof, and stitches are formed in at least two lines such that the folded parts of the tether are not irregular or waved. In addition, in order to increase adhesion in the folded parts, cut parts are formed with a predetermined interval to reduce the chance of the tether being twisted. Accordingly, an airbag cushion can be properly deployed and expanded.

Hereinafter, preferred embodiments of the present invention will be described in detail with reference to accompanying drawings.

Figure 2:
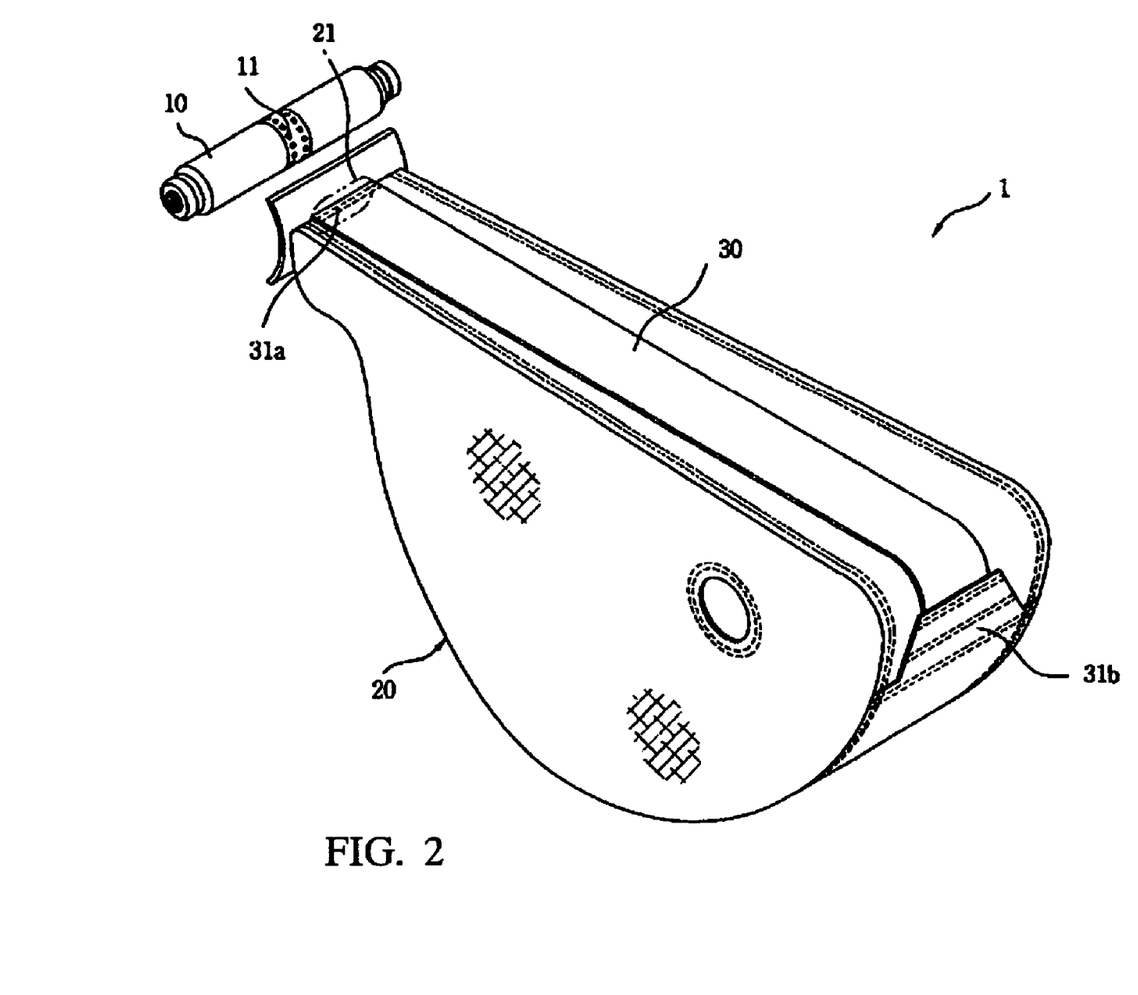
FIG. 2 is a perspective view schematically showing a passenger airbag module for a vehicle according to the present invention.
Figure 3:
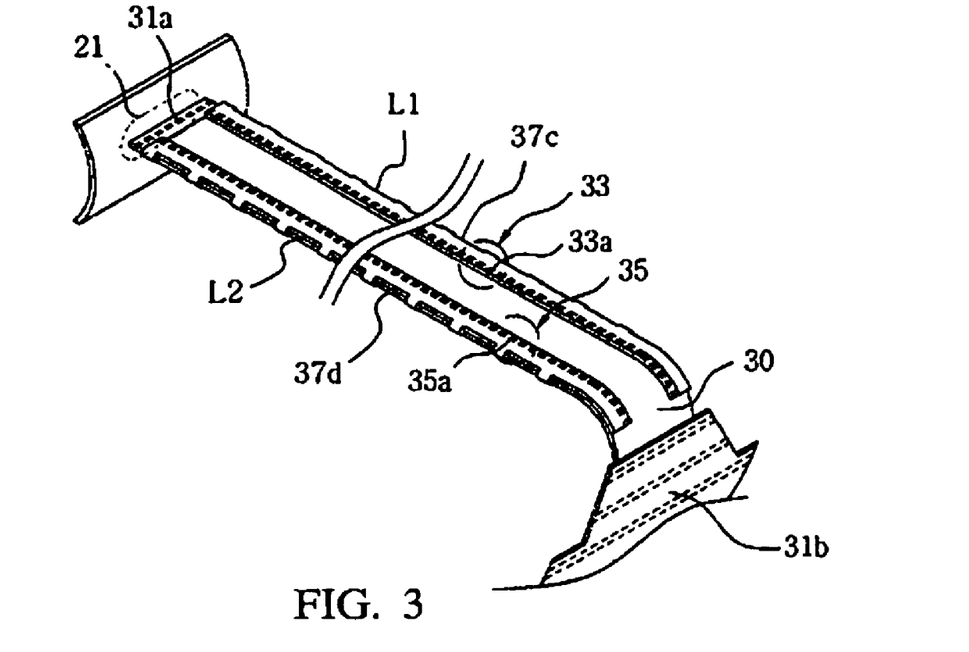
FIG. 3 is a partial perspective view schematically showing a tether of the passenger airbag module for the vehicle according to the present invention.

FIG. 2 is a perspective view schematically showing a passenger airbag module 1 for a vehicle according to the present invention, and FIG. 3 is a partial perspective view schematically showing a tether 30 of the passenger airbag module 1 according to the present invention.

As shown in FIGS. 2 and 3, the passenger airbag module 1 according to the present invention is installed at an upper inner portion of a front surface of an instrument panel installed while facing a passenger seat.

The passenger airbag module 1 is designed to inflate an airbag using an inflator to generate nitrogen gas (N2) upon the explosion of a detonator in an inflator housing, which is installed at the upper inner portion of the front surface of the instrument panel, when an impact sensor detects head-on collision or rear-end collision of a vehicle.

The passenger airbag module 1 includes an inflator 10 that generates the N2, an airbag cushion 20 deployed and inflated by the N2, and a tether 30 properly maintaining the deployment shape and length of the airbag cushion 20.

The inflator 10 is designed such that the detonator therein is ignited according to an impact signal for impact energy detected by the impact sensor (not shown). In addition, the inflator 10 is provided therein with a gas generating agent used to generate the N2, and is provided at a center portion having gas exhaust ports 11 to inject the N2 into the airbag cushion 20.

The airbag cushion 20 includes a front part having a sufficient size to make contact with the head and the breast of the passenger such that the head and the breast of the passenger can be protected from impact in vehicle crash. The airbag cushion 20 includes a rear part provided with a gas injection port 21 receiving the N2 that has been exhausted from the gas exhaust ports 11 of the inflator 10.

The airbag cushion 20 must be deployed by the distance between the instrument panel and the passenger. The airbag cushion 20 includes the tether 30, which connects the front part of the airbag cushion 20 making contact with the body of the passenger with the rear part of the airbag cushion 20 receiving the N2 from the inflator 10 inside the airbag cushion 20, such that the deployment length and shape of the airbag cushion 20 can be properly maintained.

Further, the tether 30 includes a first support part 31a allowing one end of the tether 30 to be fixed to the rear part of the airbag cushion 20 through sewing, and a second support part 31b allowing the other end of the tether 30 to be fixed to the front part of the airbag cushion 20 through sewing.

The tether 30 wrapped around the inflator 10 and installed with the airbag cushion 20 that can be easily folded, and can serve as a partition plate and formed of a material the same as or different from that of the airbag cushion 20.

In addition, the tether 30 includes first and second twist preventing parts 33 and 35 formed by folding both edges thereof with a predetermined width to increase the thicknesses of both edge folds to an edge fold thickness of the tether 30, thereby preventing the tether 30 from being twisted or folded in the deployment.

The first and second twist preventing parts 33 and 35 are folded in the deployment direction of the tether 30 along the edge of the tether. In detail, the first twist preventing part 33 is formed by folding one edge of the tether 30 with a predetermined width to form a first edge fold and fixing the first folded edge by sewing, and the second twist preventing part 35 is formed by folding a second edge of the tether 30 with a predetermined width to form a second edge fold and fixing the second folded edge by sewing.

In sewing the first folded edge of the tether 30, preferably at least two first sewed lines 33a are formed in the deployment direction along an edge of the tether 30. In order to increase the reliability of the first twist preventing part 33, at least two first sewed lines 33a are formed and stitches thereof may offset from each other on each sewed line.

In sewing another folded part of the tether 30, at least two second sewed lines 35a are formed in the deployment direction along an edge of the tether 30. In order to increase the reliability of the second twist preventing part 35, at least two second sewed lines 35a are formed and stitches thereof may offset from each other on each sewed line.

Hereafter, the operational procedure of the passenger airbag module 1 for the vehicle according to the present invention will be schematically described.

First, when the driving speed of the vehicle is abruptly decelerated, so that the acceleration of gravity becomes a preset value, the impact sensor generates an impact signal for impact detected thereby to transmit the impact signal to an electronic control module, and the electronic control module explodes the detonator of the inflator 10.

Then, the N2 is injected into the gas injection port 21 of the airbag cushion 20 through the gas exhaust port 11 due to the explosion of the detonator, and the airbag cushion 20 is deployed and expanded toward the passenger from the instrument panel by the N2.

In the passenger airbag module 1 according to the present invention, both side parts of the tether 30 are folded and sewed in the deployment direction of the airbag cushion 20 such that the tether 30 is not twisted or folded when the tether 30 is deployed by the N2.

Figure 4:
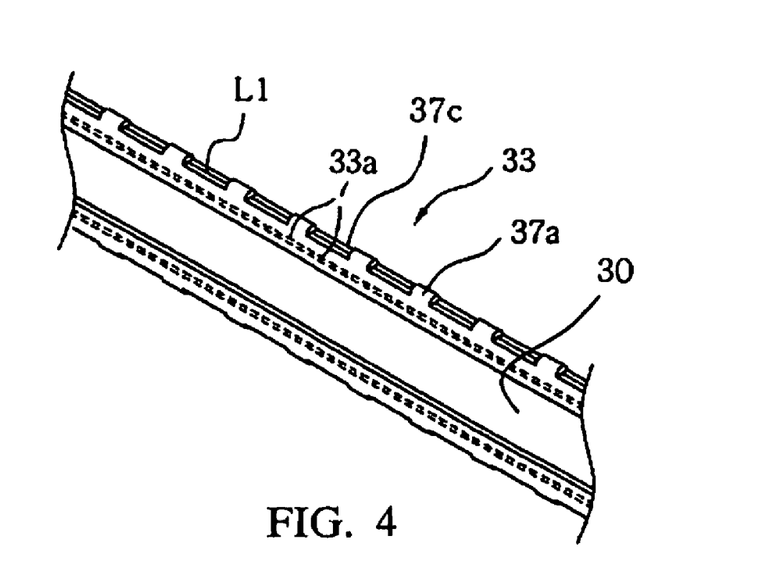
FIG. 4 is an enlarged perspective view schematically showing a first twist preventing part of the tether of FIG. 3.
Figure 5:
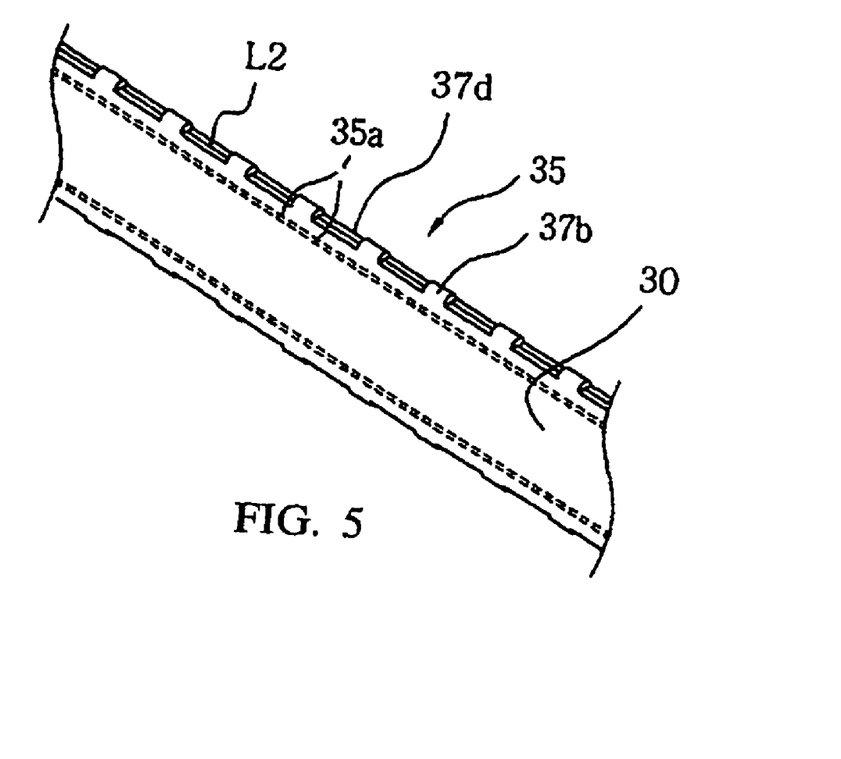
FIG. 5 is an enlarged perspective view schematically showing a second twist preventing part of the tether of FIG. 3.

Accordingly, since both edges of the tether 30 become thicker than a central portion of the tether 30, the tether 30 that has wound around the inflator 10 is not twisted or folded when the tether 30 is deployed by the N2. Protection reliability of the passenger can be improved by preventing deployment length of the tether from being reduced due to twist and folding. In addition, the airbag cushion 20 is exactly deployed according to a design thereof by the gas pressure of the inflator 10 and the tether 30 according to the present invention to restrain the passenger, thereby protecting the passenger from the impact. FIG. 4 is an enlarged perspective view schematically showing the first twist preventing part 33 of the tether 30 of FIG. 3, and FIG. 5 is an enlarged perspective view schematically showing the second twist preventing part 35 of the tether 30 of FIG. 3.

As shown in FIG. 4, the first edge fold of the tether 30 is folded with a predetermined width and the first edge fold of the tether 30 is sewed in at least two sewed lines 33a, to form the first twist preventing part 33. In addition, in order to prevent the tether 30 from being delaminated about a folded line L1 when the tether 30 is folded at least twice, first cutouts 37c are separated by connection sections 37a are formed with a predetermined interval along a folded line L1. Due to the first connection sections 37a formed between the first cutouts 37c, the sewing process can be easily accomplished.

The second edge fold of the tether 30 is folded with a predetermined width and the second edge fold of tether 30 is sewed in at least two sewed lines 35a to form the second twist preventing part 35. In addition, in order to prevent the tether 30 from being delaminated at the folded part when the tether 30 is folded at least twice, second cutouts 37d are formed with a predetermined interval along a folded line L2. Due to second connection sections 37b formed between the second cutouts 37d, the sewing process can be easily accomplished.

When the tether 30 is manufactured, the width of the fabric forming tether 30 is cut wider by a predetermined width than that of a conventional technology and then both edges of the tether 30 are folded such that the first and second twist preventing parts 33 and 35 are formed.

The first and second connection parts 37a and 37b prevent the folded parts of the tether 30 from being irregular or waved and increase adhesion at the folded edges when the first and second sewed lines 33a and 35a are formed by sewing the folded parts.

Figure 6:
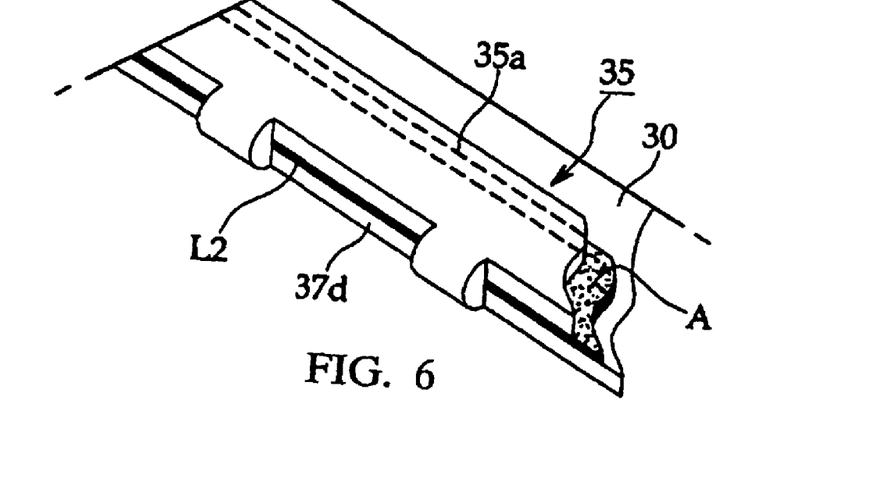
FIG. 6 is a view showing a part of the tether of an airbag cushion of the passenger airbag module for the vehicle according to another embodiment of the present invention.

FIG. 6 is a view showing a portion of the tether 30 of the passenger airbag module 1 for the vehicle according to another embodiment of the present invention.

Referring to FIG. 6, the first and second twist preventing parts 33 and 35 may be formed by folding both edges of the tether 30 with a predetermined width, and bonding the folded parts of the tether 30 using an adhesive A.

In this case, in order to form the first and second twist preventing parts 33 and 35, width of the fabric forming the tether 30 are cut wider than that of a conventional technology and both edges of the tether 30 are folded. Then, the folded portions of the tether 30 are bonded by using the adhesive A such that the folded portions of the tether 30 are fixed to each other. Subsequently, in order to prevent the bonded parts of the tether 30 from being delaminated such that the bonded parts are fixed to each other, the first and second cut parts 37c and 37d are formed with a predetermined interval along the first and second folded lines L1 and L2.

The first and second connection parts 37a and 37b formed between the first and second cut parts 37c and 37d prevent the tether 30 from being irregular or waved when the folded parts of the tether 30 are bonded, and enhance adhesion at the folded parts of the tether 30 through the first and second cut parts 37c and 37d.

Figure 7:
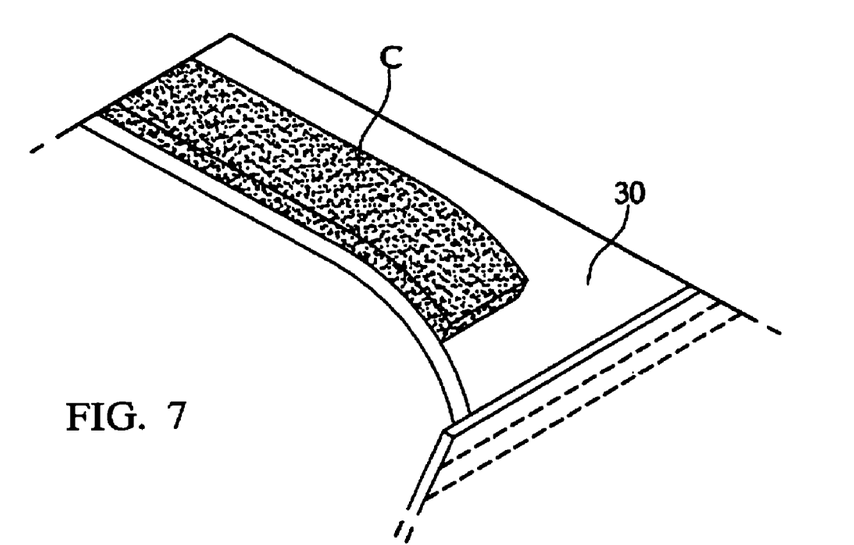
FIG. 7 is a view showing a part of the tether of the airbag cushion of the passenger airbag module for the vehicle according to still another embodiment of the present invention.

FIG. 7 is a view showing a part of the tether 30 of the passenger airbag cushion for the vehicle according to still another embodiment of the present invention.

Referring to FIG. 7, the first and second twist preventing parts 33 and 35 may be formed, by applying a coating substance C to both side parts of the tether 30 with a predetermined thickness. The coating is illustrated as applied along one edge to form one twist preventing part, but would also be applied along the other edge to form the other twist preventing part.

When the first and second twist preventing parts 33 and 35 are formed by applying a coating substance, it is unnecessary to cut width of the tether 30 wider than that of the finished tether width as required in the previous embodiments. In addition, it is unnecessary to fold both side parts of the tether 30, and further to bond and cut the folded parts of the tether 30 such that the folded parts are not delaminated but fixed to each other. Accordingly, the manufacturing cost can be reduced.

Figure 8:
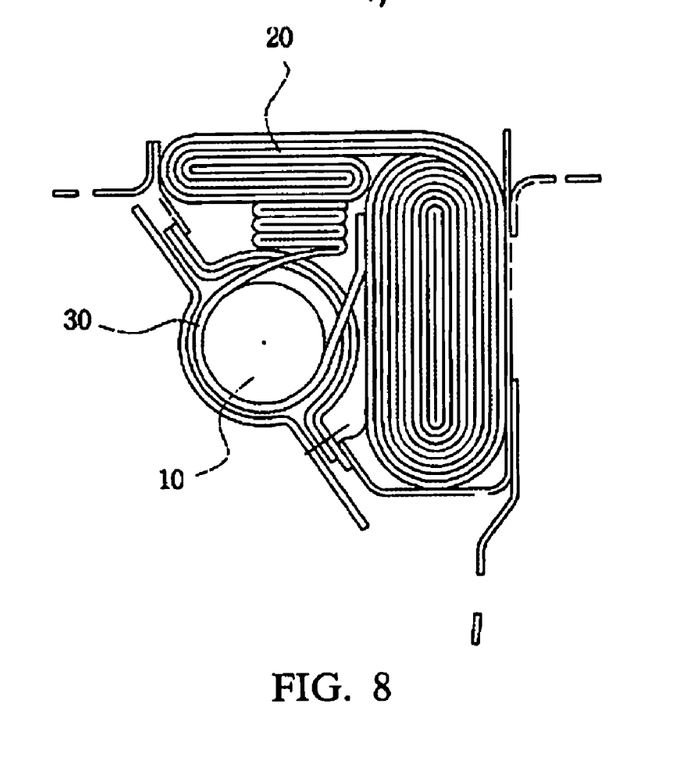
FIG. 8 is a view showing the deployment shape of an airbag cushion and the tether according to the embodiments of the present invention.

FIG. 8 is a view showing the pre-deployment shape of the airbag cushion 20 and the tether 30 according to the embodiments of the present invention. As shown in FIG. 8, the tether 30 properly maintaining the deployment length of the airbag cushion 20 fixedly surrounds the inflator 10.

In this case, after the tether 30 has been wound around the inflator 10 mounted on one side of an outer portion of an airbag housing, both side parts of the tether 30 are fixedly sewed or bonded in the airbag cushion 20.

The airbag cushion 20 is folded several times and accommodated in the airbag housing, and the airbag housing is provided in the instrument panel at the side of a passenger seat of the vehicle. The airbag cushion 20 is folded in parallel to an upper part of the inflator 10 and a second part that is folded in parallel to a side part of the inflator 10.

FIGS. 9A to 9F are views showing the deploying procedure of the airbag cushion 20 according to the embodiments of the present invention. As shown in FIGS. 9A to 9F, when impact is excessively exerted on the vehicle, the airbag module 1 is operated.

First, gas exhausted from the inflator 10 is injected into the airbag cushion 20, so that the airbag cushion 20 is expanded toward the passenger. At this time, the deployment length of the airbag cushion 20 is properly maintained by the tether 30, and the airbag cushion 20 is swollen toward the passenger by the length of the tether 30, so that impact exerted on the passenger is attenuated.

Figure 9A:
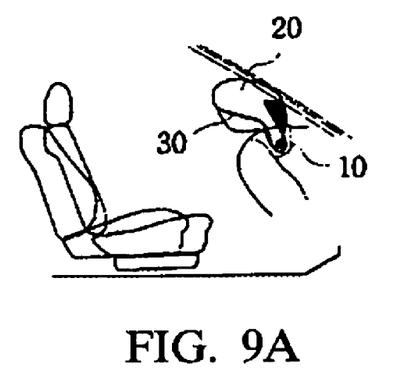
FIGS. 9A to 9F are views showing the deployment procedure of an airbag cushion according to the embodiments of the present invention.
Figure 9B:
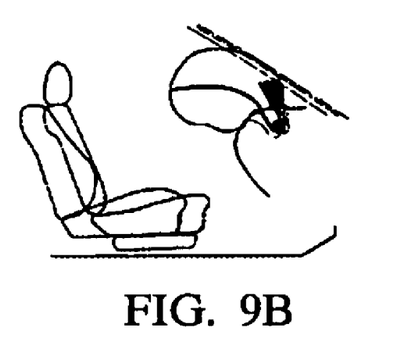

In detail, FIG. 9A shows an initialization procedure of expanding the airbag cushion 20. As shown in FIG. 9A, the airbag cushion 20 is deployed upward to make contact with a windshield of the vehicle. Thereafter, as shown in FIG. 9B, while the airbag cushion 20 is being expanded, the airbag cushion 20 is deployed toward the lower half of the passenger along the surface of the instrument panel.

Figure 9C:
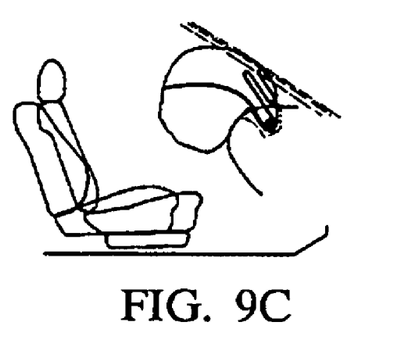
Figure 9D:
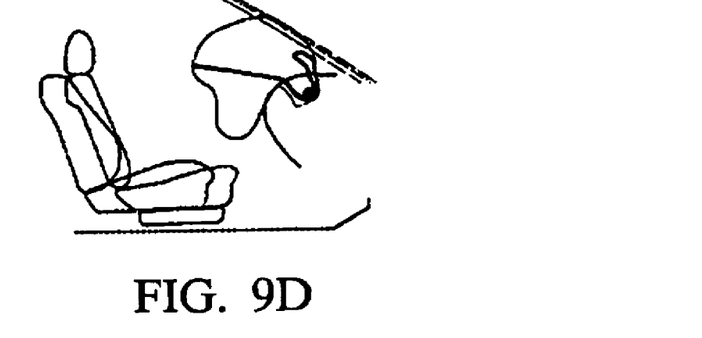
Figure 9E:
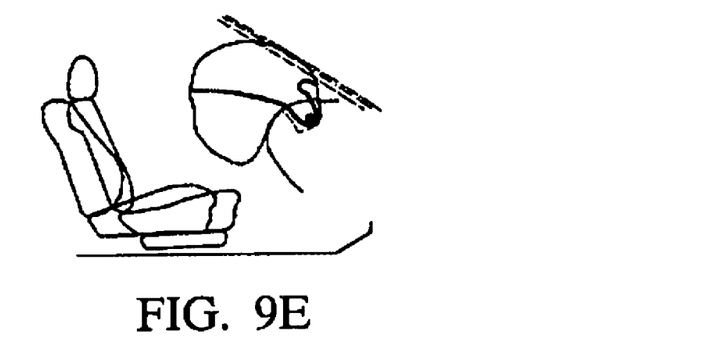
Figure 9F:
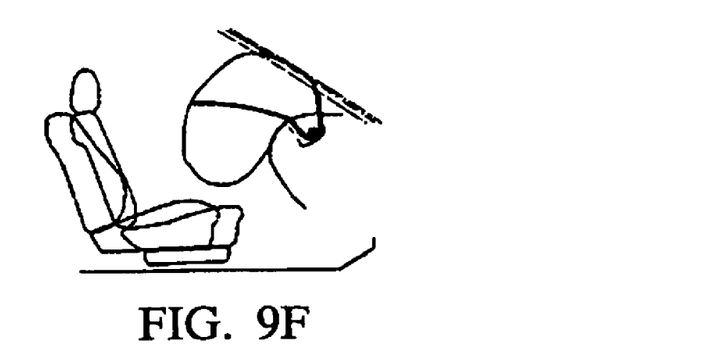

The deploying speed of the airbag cushion 20 toward the passenger can be reduced because the tether 30 is folded at both side parts thereof. As shown in FIG. 9C, since both side parts of the tether 30 is folded at the side of the windshield, the deploying speed of the airbag cushion 20 is reduced by the releasing speed of the tether 30 from the inflator 30.

As shown in FIGS. 9A to 9F, the deploying speed of the airbag cushion 20 deployed toward the passenger is reduced to prevent the passenger from being injured due to the airbag cushion 20. In addition, load exerted on the windshield is scattered to prevent the windshield from being damaged.

Although an exemplary embodiment of the present invention has been described for illustrative purposes, those skilled in the art will appreciate that various modifications, additions and substitutions are possible, without departing from the scope and spirit of the invention as disclosed in the accompanying claims. While this invention has been described in terms of the preferred embodiments thereof, it is not intended to be so limited, but rather only to the extent set forth in the claims that follow.

We claim:

1. An airbag module adjacent a vehicle seat, said airbag module comprising:
    an inflator for generating a gas;
    an airbag cushion adapted to be inflated by the gas; and
    a tether having a first end coupled to the airbag cushion at a first point, a second end coupled to the airbag cushion at a second point spaced apart from the first point, and an edge extending therebetween, said tether formed of a fabric having a fabric thickness and having a twist preventing part disposed along the edge, said twist preventing part having a thickness greater than the fabric thickness;
    the tether further having a centerline and a first edge and a second edge spaced apart about the centerline, said tether being characterized by the fabric thickness along said centerline and comprising a first twist preventing part adjacent a first edge having a first edge thickness greater than the fabric thickness and a second twist preventing part adjacent a second edge having a second edge thickness greater than the fabric thickness;
    the first twist preventing part and the second twist preventing part being comprised of the fabric folded along the first edge and the second edge, respectively, thereby forming a first edge fold and the second edge fold, respectively, wherein the first edge fold and the second edge fold include a plurality of cutouts separated by connection sections along the first edge and the second edge.

2. An airbag module of claim 1, wherein the first twist preventing part and the second twist preventing part further comprise a coating applied to the fabric.

3. An airbag module of claim 1, wherein the first edge thickness is equal to the second edge thickness.

4. An airbag module of claim 1, wherein the first twist preventing part and the second twist preventing part further comprise stitches to fasten the first edge fold and the second edge fold.

5. An airbag module of claim 4, wherein the stitches in the first edge fold are disposed in at least two sewed lines parallel to the first edge such that the stitches in one sewed line are offset relative to the stitches in the other sewed line.

6. An airbag module of claim 1, wherein the first twist preventing part and the second twist preventing part further comprise an adhesive bonding the first edge fold and the second edge fold.

* * * * *